United States Patent
Stockwell et al.

(10) Patent No.: US 9,912,518 B2
(45) Date of Patent: Mar. 6, 2018

(54) SYSTEM AND METHOD FOR REGULATING THE UPLOAD OF FILES FOR A MOBILE DEVICE

(71) Applicant: Dropbox, Inc., San Francisco, CA (US)

(72) Inventors: Will Stockwell, San Francisco, CA (US); Alex Sydell, San Francisco, CA (US); Tony Grue, San Francisco, CA (US); Kyle Consalus, San Francisco, CA (US); Tina Wen, San Francisco, CA (US); Jeff Bartelma, San Francisco, CA (US); Aseem Sood, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 475 days.

(21) Appl. No.: 13/870,807

(22) Filed: Apr. 25, 2013

(65) Prior Publication Data
US 2014/0189061 A1   Jul. 3, 2014

Related U.S. Application Data

(60) Provisional application No. 61/746,450, filed on Dec. 27, 2012.

(51) Int. Cl.
| | |
|---|---|
| G06F 15/16 | (2006.01) |
| H04L 29/08 | (2006.01) |
| H04W 52/02 | (2009.01) |
| G06F 15/167 | (2006.01) |
| H04B 7/00 | (2006.01) |

(Continued)

(52) U.S. Cl.
CPC ........ *H04L 29/08117* (2013.01); *H04L 67/06* (2013.01); *H04W 52/0261* (2013.01); *Y02B 60/50* (2013.01)

(58) Field of Classification Search
CPC ............. H04L 29/08117; H04L 67/06; H04W 52/0261; H04W 72/0493; G06F 1/3203; G06F 1/3212
USPC ........ 320/134; 709/213, 217, 218; 455/41.2, 455/67.11, 405, 466; 713/323, 340
See application file for complete search history.

(56) References Cited

U.S. PATENT DOCUMENTS

| | | | | |
|---|---|---|---|---|
| 5,710,931 A | * | 1/1998 | Nakamura | G06F 1/3203 307/66 |
| 8,655,307 B1 | * | 2/2014 | Walker | H04W 52/0212 455/343.5 |

(Continued)

*Primary Examiner* — Emmanuel L Moise
*Assistant Examiner* — Vitali Korobov
(74) *Attorney, Agent, or Firm* — Polsinelli PC

(57) ABSTRACT

A content management server that uploads files from a mobile device to a cloud-based storage location based on a battery level associated with the mobile device. The content management system receives mobile device operating information and regulates the upload of files based on the mobile device operating information. In various embodiments, the mobile device operating information includes battery information. If the mobile device battery level drops below a first predetermined level, the content management system regulates the upload of files. Once the upload of files is regulated, the content management system continues to monitor the mobile device operating information. If the content management system determines that the mobile device battery level exceeds a second predetermined level, the content management system resumes the file upload process.

17 Claims, 3 Drawing Sheets

(51) Int. Cl.
　　 *H04B 17/00* (2015.01)
　　 *H04M 11/00* (2006.01)
　　 *H04W 4/00* (2009.01)
　　 *G06F 1/00* (2006.01)
　　 *G06F 11/30* (2006.01)

(56) References Cited

U.S. PATENT DOCUMENTS

| | | | | |
|---|---|---|---|---|
| 2006/0174205 A1* | 8/2006 | Jung | ............... | H04N 1/00068 715/751 |
| 2009/0037756 A1* | 2/2009 | Lundquist | ............ | G06F 1/3203 713/323 |
| 2009/0164823 A1* | 6/2009 | Aaltonen | ........... | G01R 31/3648 713/340 |
| 2011/0087842 A1* | 4/2011 | Lu | .................... | G06F 17/30867 711/126 |
| 2011/0099302 A1* | 4/2011 | Ozeki | ............... | H04N 5/23241 710/33 |
| 2012/0102139 A1* | 4/2012 | Tran | ...................... | G06F 9/4843 709/213 |
| 2012/0214418 A1* | 8/2012 | Lee | ....................... | G06F 1/3209 455/41.2 |
| 2013/0082662 A1* | 4/2013 | Carre | ................... | H02J 7/0052 320/134 |
| 2013/0144968 A1* | 6/2013 | Berger | .................. | H04L 67/32 709/217 |
| 2013/0324120 A1* | 12/2013 | Boccardi | ............... | H04W 24/10 455/435.1 |
| 2014/0045436 A1* | 2/2014 | Gutierrez, Jr. | .... | H04M 1/72522 455/67.11 |
| 2014/0120961 A1* | 5/2014 | Buck | ...................... | H04W 4/12 455/466 |
| 2014/0128021 A1* | 5/2014 | Walker | ............. | H04W 52/0212 455/405 |

* cited by examiner

SYSTEM AND METHOD FOR REGULATING THE UPLOAD OF FILES FOR A MOBILE DEVICE

CROSS REFERENCE TO RELATED APPLICATIONS

This application claims the benefit of priority under 35 U.S.C. § 119(e) to U.S. Provisional Patent Application No. 61/746,450, filed on Dec. 27, 2012, which is incorporated herein by reference in its entirety.

BACKGROUND

Today's mobile devices can, and in some cases do, replace traditional desktop and laptop computers. Mobile devices are compact and may have limited storage space for files, photos, and videos. As a result, the mobile device hardware limits the user's ability to store files, photos, and videos on the mobile device. In response to these issues, some content management services now enable cloud-based cross-platform content synchronization and sharing (e.g., Dropbox™) which enables users to conveniently upload, store, and view files on any device associated with the account.

However, the battery life on mobile devices is limited compared to traditional desktop or laptop computers. Thus, an upload of files from a mobile device to a cloud-based content management service can drain the battery of the mobile device as it taxes the mobile device during the upload of files to the content management system. The present systems and methods recognize and address the foregoing and other considerations of prior art system and methods.

SUMMARY

A computer-implemented method of providing a service on a mobile device, in various embodiments, may include: (1) receiving operating information from a mobile device; (2) comparing the received operating information against at least one criterion; (3) enabling an upload of files from the mobile device to a cloud-based storage location if the received mobile device operating information satisfies the criterion; and (4) regulating the upload of files from the mobile device when the received mobile device operating information does not satisfy the criterion. In various embodiments, the step of facilitating an upload of files from the mobile device may include uploading the files from the mobile device to the cloud-based storage location when the mobile device is connected to a network. In some embodiments, the network may be either a Wi-Fi connection or a cellular network connection. In still other embodiments, the method may further include the step of, after detecting that mobile device operating information does not satisfy the criterion, detecting whether the mobile device operating information satisfies at least a second criterion, and if so, restarting the uploading of the files from the mobile device to the cloud based-storage location when the mobile device operating information satisfies the second criterion. In various embodiments, the mobile device operating information includes battery level information, the first criterion is a first battery threshold level, and the second criterion is a second battery threshold level. In some of these embodiments, the first battery threshold level is about ten to thirty percent, and the second battery threshold level is about thirty to sixty percent. In other embodiments, the mobile device operating information may also include a temperature of the mobile device and the first criterion may be a temperature level.

A content management system, in various embodiments, may include at least one processor that is configured to: (1) receive battery information from a mobile device; (2) enable an upload of files from the mobile device to a cloud-based storage location if at least one criterion is satisfied; (3) associate the files with an account for a user of the mobile device; (4) monitor the received battery information to determine that the first criterion is satisfied; and (5) regulate the upload of photos when the battery information does not satisfy the first criterion. In some embodiments, the first criterion is a first battery threshold level. In various embodiments, the at least one processor is further configured to restart the upload of photos from the mobile device to the cloud-based storage location when the received battery information satisfies at least a second criterion. In some embodiments, the second criterion may be a battery threshold level that is greater than the first battery threshold level.

BRIEF DESCRIPTION OF THE DRAWINGS

Various embodiments of a computer system for uploading files from a mobile device while monitoring battery life are described below. In the course of this description, references will be made to the accompanying drawings, which are not necessarily drawn to scale, and wherein.

DETAILED DESCRIPTION

Figure 1:
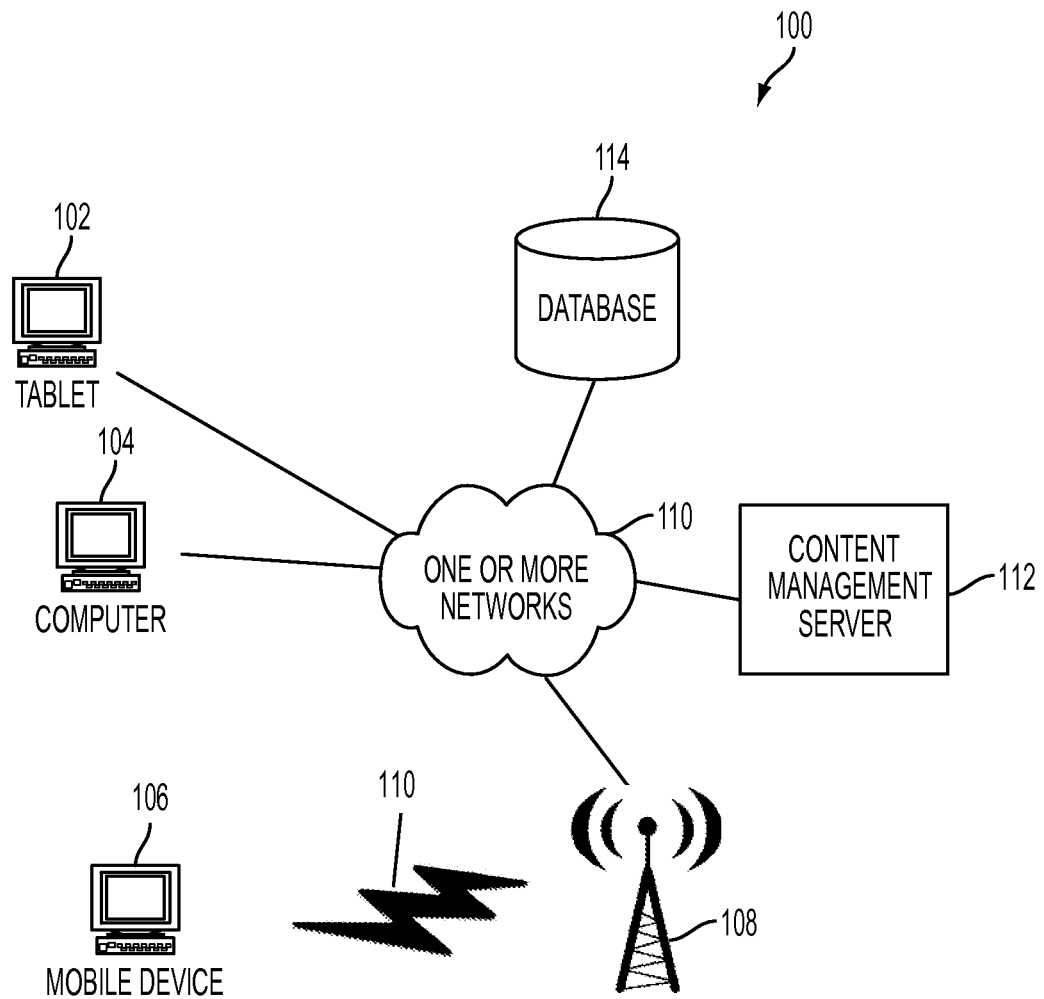
FIG. 1 shows a block diagram of a content management system in accordance with an embodiment of the present system.

Various embodiments will now be described. It should be understood that the present system and method may be embodied in many different forms and should not be construed as limited to the embodiments set forth herein. Like numbers refer to like elements throughout.

System Overview

The present system and method, in accordance with various embodiments, can provide a computer system adapted to provide a content management system that uploads files from a mobile device to a cloud-based storage location. It should be understood that the upload can be automatic, partially automatic, started manually, triggered by some event or external source, or any other suitable uploading method. In order to optimize battery life, the content management system receives mobile device operating information and regulates the upload of files based on the mobile device operating information. In various embodiments, the mobile device operating information includes battery information. Thus, when a battery level of the mobile device drops below a first predetermined level, the content management system regulates the upload of files to preserve the mobile device battery life. The content management system may regulate the upload of files, for example, by throttling back the upload, stopping the upload, or pausing the upload. Once the upload of files is regulated, the content management system continues to monitor mobile device operating information. If the content management system determines that the mobile device battery level exceeds a second predetermined level, the content management system will resume the file upload process. The present system and method is advantageous in that it will only perform an upload of files when the mobile device has sufficient battery life.

Exemplary Technical Platforms

As will be appreciated by one skilled in the relevant field, the present invention may be, for example, embodied as a computer system, a method, or a computer program product. Accordingly, various embodiments may be entirely hardware or a combination of hardware and software. Furthermore, particular embodiments may take the form of a computer program product stored on a computer-readable storage medium having computer-readable instructions (e.g., software) embodied in the storage medium. Various embodiments may also take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatus (e.g., systems), and computer program products. It should be understood that each element of the block diagrams and flowchart illustrations, and combinations of elements in the block diagrams and flowchart illustrations, respectively, can be implemented by a computer executing computer program instructions. These computer program instructions may be loaded onto a general purpose computer, a special purpose computer, smart mobile device, or other programmable data processing apparatus to produce a machine. As such, the instructions which execute on the general purpose computer, special purpose computer, smart mobile device, or other programmable data processing apparatus create means for implementing the functions specified in the flowchart block or blocks. The program code may execute entirely on the user's computer, partly on the user's computer, as a stand-alone software package, partly on the user's computer and partly on a remote computer, or entirely on the remote computer. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, block diagram elements and flowchart illustrations support combinations of mechanisms for performing the specified functions, combinations of steps for performing the specified functions, and program instructions for performing the specified functions. It should also be understood that each block diagram element and flowchart illustration, and combinations of block diagram elements and flowchart illustrations, can be implemented by special purpose hardware-based computer systems that perform the specified functions or steps, or combinations of special purpose hardware and other hardware executing appropriate computer instructions.

Exemplary System Architecture

FIG. 1 is a block diagram of content management system 100 according to a particular embodiment. As may be understood from this figure, content management system 100 includes remote computing devices such as tablet computer 102, desktop or laptop computer 104, or mobile computing device 106 (e.g., a handheld device, a cellular phone, a smart phone, or any other device capable of transferring files over network 110) that are in communication with content management server 112 (which, for example, may be used to execute one or more modules as described below) and content management database 114 (which, for example, may be used to store the files on the content management system) via one or more networks 110. Network 110, between content management server 112 and remote computing devices 102, 104, and 106, may be, for example, implemented via one or more wired or wireless networks such as LANs, WANs, a cellular network, a Wi-Fi network, or via the Internet. For purposes of ease of explanation and clarity, no specific network is shown in FIG. 1. Network 110 may include any of a variety of types of wired or wireless communication networks, such as the Internet. Mobile device 106 may transmit data wirelessly over a cellular network by communicating with a cellular tower 108. For purposes of ease of explanation and clarity, cellular tower 108 is shown coupled to network 110. However, the cellular tower may be coupled to a cellular network provider, which is operatively coupled to network 110.

Tablet computer 102, desktop computer 104, and mobile device 106 may be associated with a single user account on content management server 112, or each may be associated with a different user account on the content management server. In various embodiments, content management server 112 may include one or more servers that are located in close physical proximity, or some servers may be locally together and others remote. In either case, all devices, wherever located, function as a system.

Content management server 112 facilitates file access and file storage between content management server 112 and client devices remote computing devices 102, 104, and 106. Content management server 112 receives files from and sends files to remote computing devices 102, 104, 106 consistent with the user's preferences for sharing files. Content management server 112 may act as the counterpart to a client-side file storage service client application user interface that allows a user to manipulate files directly stored on content management server 112. In some embodiments, software operating on remote computing devices 102, 204, 106 integrates network-stored files with the client's local file system to enable a user to manipulate network-stored files through the same user interface (UI) used to manipulate files on the local file system, e.g., via a file explorer, file finder or browser application. As an alternative or supplement to the client-side file-explorer interface, content management server 112 may provide a web interface for remote computing devices 102, 104 106 to access (e.g. via a web browser) and allow a user to manipulate files stored on content management server 112. In this way, the user can directly manipulate files stored on content management server 112.

In various embodiments, content management database 114 stores files such as those uploaded using remote computing devices 102, 104, 106. It should be understood that, in various embodiments, content management database 114 may include multiple data stores—some local to, and some remote from, content management server 112.

Content management database 114 maintains, for each user, information identifying the user, information describing the user's file directory, etc. in a file journal. In some embodiments, the file journal is maintained on content management server 112. This file journal may be updated periodically using information obtained directly from content management server 112 and/or from information obtained from one or more remote client devices 102, 104, 106. In this way, the file journal on content management server 112 (hereinafter the "server-side file journal") is updated when a file is changed on the server or on one of the remote client devices associated with a user's account. Content management server 112 then communicates with the other remote client devices 102, 104, 106 that are linked to the user's account to propagate the change locally on the other remote client devices. For example, if a user makes a change to a particular file on a first client device, the change may be reflected in the server-side file journal. The system then uses the server-side file journal to propagate the changes to the file on all other client devices associated with the user's account. Such techniques may be implemented, for example, within the context of a synchronized file system such as the Dropbox™ service of Dropbox, Inc. of San Francisco, Calif.

Figure 2:
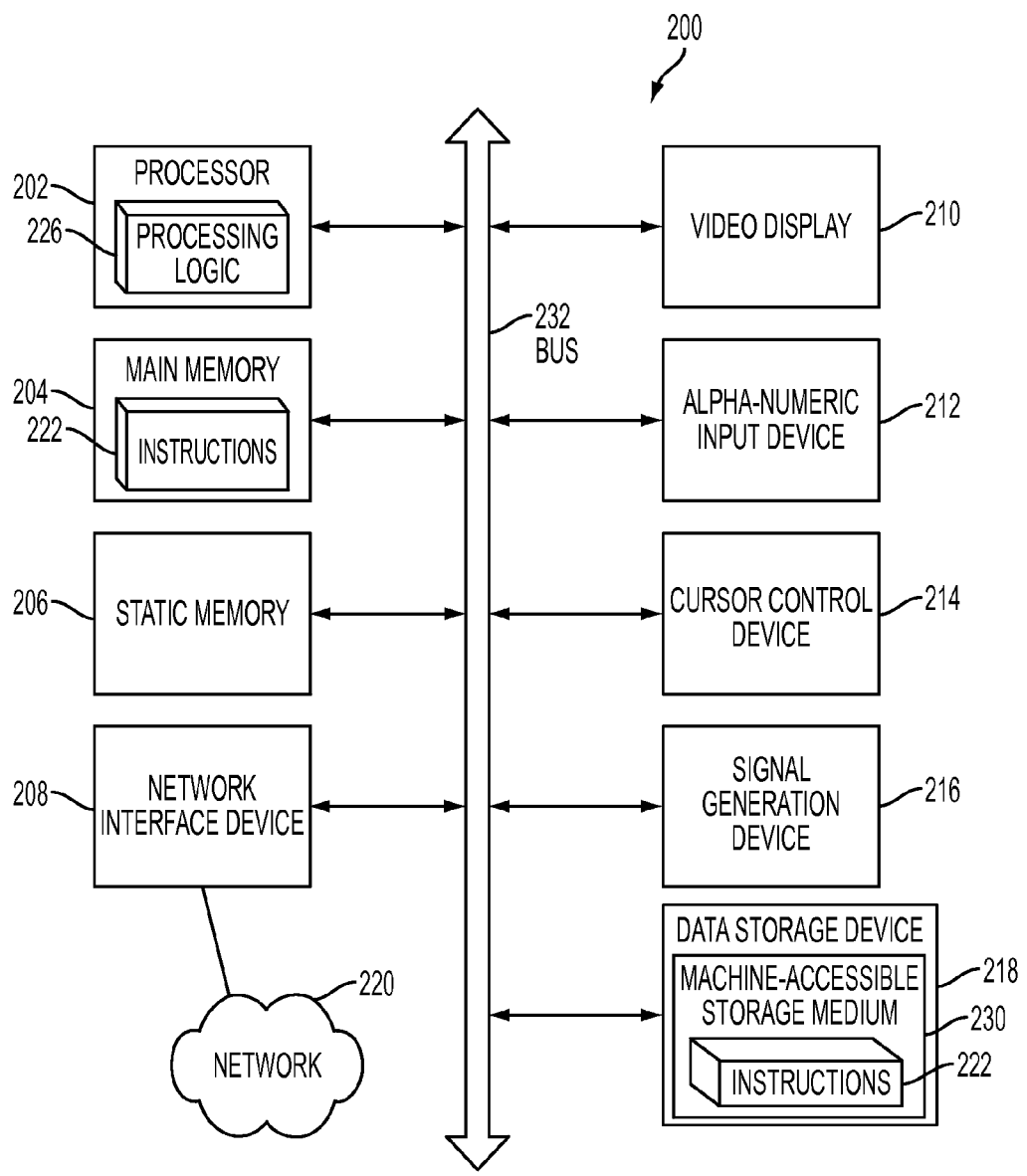
FIG. 2 shows a block diagram of a computer that may be used, for example, within the context of the content management system of FIG. 1.

FIG. 2 illustrates a diagrammatic representation of computer 200 that can be used within content management system 100, for example, as a client computer (e.g. tablet 102, computer 104 or mobile device 106), or as content management server 112 (FIG. 1). For purposes of this disclosure, reference to a server or processor, shall be interpreted to include either a single server, a single processor, or multiple servers, or multiple processors.

In particular embodiments, computer 200 may be connected (e.g., networked) to other computers by a LAN, WAN, an intranet, an extranet, and/or the Internet. Computer 200 may operate in the capacity of a server or a client computer in a client-server network environment, or as a peer computer in a peer-to-peer (or distributed) network environment. Computer 200 may be a personal computer (PC), a tablet PC, a mobile device, a web appliance, a server, a network router, a switch or bridge, or any computer capable of executing a set of instructions (sequential or otherwise) that specify actions to be taken by that computer. Further, while only a single computer is illustrated, the term "computer" may also include any collection of computers that individually or jointly execute a set (or multiple sets) of instructions to perform any one or more of the methodologies discussed herein.

Exemplary computer 200 may include processor 202, main memory 204 (e.g., read-only memory (ROM), flash memory, dynamic random access memory (DRAM) such as synchronous DRAM (SDRAM) or Rambus DRAM (RDRAM), etc.), static memory 206 (e.g., flash memory, static random access memory (SRAM), etc.), and data storage device 218, which communicate with each other via bus 232.

Processor 202 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 202 may also be one or more special-purpose processing devices such as an application specific integrated circuit (ASIC), a field programmable gate array (FPGA), a digital signal processor (DSP), a network processor, or the like. Processor 202 may be configured to execute processing logic 226 for performing various operations and steps discussed herein.

Computer 200 may further include a network interface device 208. Computer 200 also may include video display 210 (e.g., a liquid crystal display (LCD) or a cathode ray tube (CRT)), alphanumeric input device 212 (e.g., a keyboard), cursor control device 214 (e.g., a mouse), and signal generation device 216 (e.g., a speaker).

Data storage device 218 may include machine accessible storage medium 230 (also known as a non-transitory computer-accessible storage medium, a non-transitory computer-readable storage medium, or a non-transitory computer-readable medium) on which is stored one or more sets of instructions (e.g., an automatic upload module, which is configured to carry out the steps illustrated in FIG. 3) embodying any one or more of the methodologies or functions described herein. An automatic upload module may also reside, completely or at least partially, within main memory 204 and/or within processing device 202 during execution thereof by computer 200, main memory 204, and processing device 202 also constituting computer-accessible storage media. Instructions 222 (e.g., automatic upload module) may further be transmitted or received over network 220 via network interface device 208.

While machine-accessible storage medium 230 is shown in an exemplary embodiment to be a single medium, the term "machine-accessible storage medium" should be understood to include a single medium or multiple media (e.g., a centralized or distributed database, and/or associated caches and servers) that store the one or more sets of instructions. The term "machine-accessible storage medium" shall also be understood to include any medium that is capable of storing, encoding, or carrying a set of instructions for execution by the computer and that cause the computer to perform any one or more of the methodologies of the present invention. The term "computer-accessible storage medium" shall accordingly be understood to include, but not be limited to, solid-state memories, optical and magnetic media.

Exemplary System Operation

Figure 3:
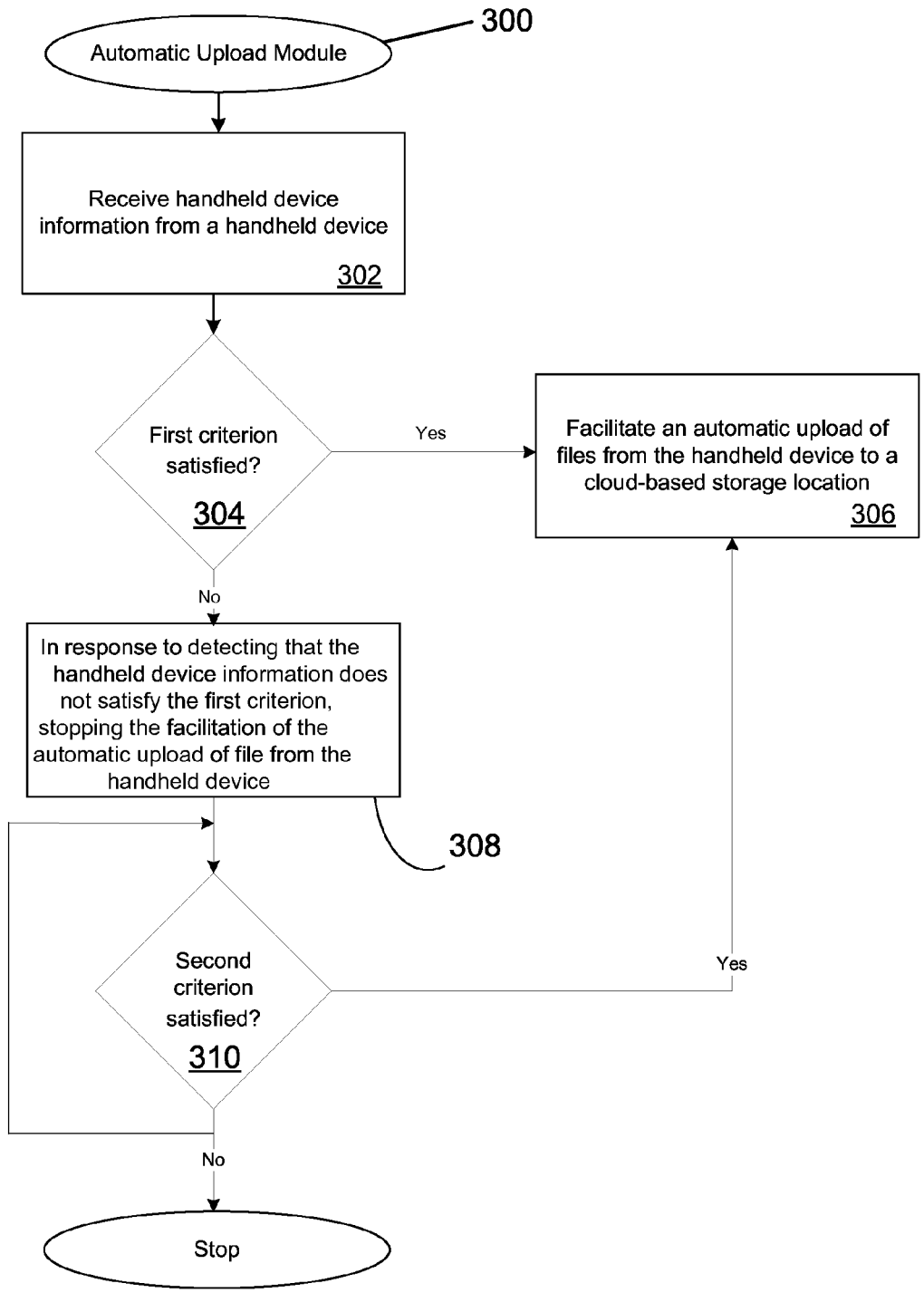
FIG. 3 shows a flow diagram that generally illustrates various steps executed by a content management system in accordance with various embodiments of the present system of FIG. 1.

Mobile device 106 and content management server 112 may alone, or in combination, perform the method steps of FIG. 3. It should be understood by reference to this disclosure that these methods describe exemplary embodiments of the method steps carried out by the present system, and that other exemplary embodiments may be created by adding other steps or by removing one or more of the method steps shown in FIG. 3.

FIG. 3 shows processing functions performed by an exemplary automatic upload module, in accordance with various embodiments, that uses battery information from a mobile device to effect the uploading of files from the mobile device to a cloud-based storage location. In various embodiments, the automatic upload module resides on the mobile device. Beginning at step 302, the automatic upload module obtains mobile device operating information from the mobile device. In various embodiments, the information may contain: (1) battery information; (2) power source information (e.g., battery power or AC power); (3) network information (e.g., cellular or Wi-Fi connection); (4) mobile device temperature information; or (5) any other suitable mobile device operating information (e.g., user information, network connection speed, etc.).

In some embodiments, the user information may include a username and password for the user of the device. The username may be, for example, an e-mail address or any suitable username accepted by the content management system that allows the user to login to an account on the content management server that is associated with the user. In various embodiments, the battery information may include a total battery capacity and current battery charge or the percentage of battery life remaining. The network information may include the upload and download speed available to the mobile device.

Once the automatic upload module obtains the mobile device operating information, at step 304, the automatic upload module may determine if the mobile device operating information satisfies a first criterion. At step 306, if the mobile device operating information satisfies the first criterion, the automatic upload module may initiate or enable an upload of files from the mobile device to the content management server. In various embodiments, the upload of files may include uploading files from the mobile device to the content management server when the mobile device is operatively connected to a network. That is, in some embodiments, if the mobile device is connected to a Wi-Fi or cellular network, the automatic upload module may upload files from the mobile device to the content management so long as the mobile device operating information satisfies the first criterion. Alternatively, the automatic upload module may block the upload files from the mobile device when the mobile device is connected to a cellular network.

In various embodiments, the first criterion may be a first battery threshold level. In other embodiments, the first criterion may be a mobile device temperature threshold level. In these embodiments, the received mobile device operating information may include battery level information, mobile device temperature information, or both. Thus, in embodiments where the first criterion is a first battery threshold level, so long as the received mobile device battery level does not drop below the first battery threshold level (e.g., satisfies the first criterion), the automatic upload module will facilitate the upload of files from the mobile device to the cloud-based storage location.

At step 308, if the received mobile device operating information does not satisfy the first criterion (e.g., the received battery level information drops below the first battery threshold level), the automatic upload module may regulate the upload of files from the mobile device. The automatic upload module uses the mobile device's battery information to regulate the uploading of files so that the file upload does not drain the mobile device's battery and render the mobile device inoperable. As indicated earlier, regulation of the upload of files includes slowing the upload, stopping the upload or scheduling the upload during an off time where the mobile device is not being used.

Thus, once the automatic upload module regulates the upload of files, the module, at step 310, continues to receive and monitor mobile device operating information to determine if the received mobile device operating information satisfies a second criterion. For example, if the mobile device is being charged, then, in various embodiments, the automatic upload module may be configured to resume the upload of files once the mobile device battery level reaches the second battery threshold level. If the module determines that the second criterion is satisfied, then at step 306, the automatic upload module may resume the upload of files. Otherwise, the automatic upload module may continue to regulate the upload until the received mobile device operating information satisfies the second criterion.

In various embodiments, the second battery threshold level may be chosen to be at least thirty percent higher than the first battery threshold level to allow the battery to charge for a sufficient amount of time prior to resuming the upload of files. This may be advantageous since some mobile devices continue to consume the battery charge even when they are being charged. In this way, the automatic upload module may allow the battery to charge for a sufficient amount of time prior to resuming the upload of files. For example, in one embodiment, the first battery threshold level may be thirty percent, and the second battery threshold level may be forty percent. Thus, so long as the received battery level stays above thirty percent, the automatic upload module may facilitate the upload of files to the cloud-based storage location. However, as soon as the received battery level reaches or drops below thirty percent, the automatic upload module may regulate the upload of files. If the automatic upload module determines that the mobile device battery is charged a sufficient amount so that the received battery level exceeds forty percent, the automatic upload module may resume the upload of files. In this way, the automatic upload module may use the device's battery level as a means of regulating the upload of files.

In various embodiments, the automatic upload module may be configured to monitor both battery level and the mobile device's temperature level. In this configuration, the automatic upload module may regulate the upload of files if the battery level drops below a first threshold value or if the device temperature exceeds a first threshold level. Thus, the use of both the battery and temperature provides a dynamic method of monitoring the mobile device to prevent depletion of the battery or overheating of the device.

In some embodiments, the automatic upload module may send a notification to the user of the mobile device. The notification may indicate that at least one or more of the following has occurred: (1) that an upload of files has completed; (2) that an upload of files was interrupted due to the battery level dropping below the first criterion; or (3) that an upload of files has resumed. In some embodiments, the notification is sent via a text message. In other embodiments, the notification may be sent using e-mail or any other suitable means to notify the user of updates to the service.

CONCLUSION

Having the benefit of the teachings presented in the foregoing descriptions and associated drawings, one of skill in the art will recognize many modifications and other embodiments of the invention. In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed:

1. A computer-implemented method of providing a service on a mobile device, the method comprising:
receiving, by a processor of an online content management system, mobile device operating information from a client application associated with the online content management system, wherein the mobile device operating information comprises battery level information;

comparing, at the online content management system, the received mobile device operating information with a first criterion, wherein the first criterion is a first battery threshold level;

sending, by the processor of the online content management system, instructions to the mobile device enabling, by a processor of the mobile device, an upload of files from the client application on the mobile device to an online content management server associated with the online content management system so long as the received mobile device operating information satisfies at least the first criterion;

sending, by the online content management system, instructions to the client application to pause the upload of files from the client application on the mobile device to the online content management system based on the received mobile device operating information fails to satisfy the first criterion;

receiving, by the processor of the online content management system, second mobile device operating information, after detecting that the mobile device operating information does not satisfy at least the first criterion;

determining, by the processor of the online content management system, whether the mobile device operating information satisfies a second criterion based on the second mobile device operating information, wherein the second criterion is a second battery threshold level; and sending, by the processor of the online content management system, instructions to the client application to resume the upload of files from the client application on the mobile device to the online content management server associated with the online content management system when the online content management system determines the second mobile device operating information satisfies at least the second criterion.

2. The computer-implemented method of claim 1, wherein enabling the upload of files from the mobile device further comprises automatically uploading the files from the mobile device to the online content management server when the mobile device is connected to a network.

3. The computer-implemented method of claim 2, wherein the network is chosen from a group consisting of:
a Wi-Fi connection; and
a cellular network connection.

4. The computer-implemented method of claim 1, wherein the files are photos.

5. The computer-implemented method of claim 1, wherein:
the first battery threshold level is about ten to thirty percent; and
the second battery threshold level is about thirty to sixty percent.

6. The computer-implemented method of claim 1, wherein the mobile device operating information comprises a temperature of the mobile device.

7. The computer-implemented method of claim 6, wherein the first criterion further comprises a temperature level.

8. The computer-implemented method of claim 1, further comprising presenting a notification on the mobile device when the first criterion is not satisfied.

9. The computer-implemented method of claim 1, wherein the step of enabling the upload of files from the mobile device to the online content management server is carried out by a synchronized file system.

10. The computer-implemented method of claim 1, wherein the mobile device is a handheld device.

11. A system comprising at least one processor; and
a non-transitory computer-readable medium having stored therein processor-executable instructions for causing the at least one processor to:
obtain battery information from a mobile device at an online content management system;
send, from the online content management system, instructions to the mobile device to enable an upload of files from a client application associated with the online content management system on the mobile device to an online content management server associated with the online content management system if a first criterion is satisfied;
associate the files with an account for a user of the client application associated with the online content management system on the mobile device;
receive updated battery information from the mobile device at the online content management system;
monitor, at the online content management system, the received updated battery information to determine that the first criterion is satisfied;
determine, at the online content management system, that the updated battery information fails to satisfy the first criterion;
regulate, at the online content management system, the upload of files from the client application to the online content management server based on the determination that the updated battery information does not satisfy the first criterion, by pausing the upload; and
instruct, via the online content management system, the mobile device to resume the upload of files from the client application on the mobile device to the online content management server when further updated battery information satisfies a second criterion.

12. The system of claim 11, wherein the first criterion is a first battery threshold level.

13. The system of claim 11, wherein the second criterion is a battery threshold level that is greater than a first battery threshold level.

14. The system of claim 11, wherein regulating the upload of files further comprises pausing the upload when the battery information does not satisfy the first criterion.

15. A computer system for providing a service on a mobile device, comprising at least one processor; and
a non-transitory computer-readable medium having stored therein processor-executable instructions for causing the at least one processor to:
obtain operating information from the mobile device at a content management system, the operating information from the mobile device comprises a battery level;
send, from the content management system, instructions to the mobile device to enable an upload of files from a client application associated with the content management system on the mobile device to a content management server associated with the content management system if a first criterion is satisfied, wherein the first criterion is whether the battery level is above a first threshold level;
receive updated operating information from the mobile device at the content management system;
monitor, at the content management system, the received updated operating information from the mobile device;
determine, at the content management system, that the received updated operating information fails to satisfy the first criterion;

regulate, at the content management system, the upload of files from the client application on the mobile device to the content management server based on the determination that the received updated operating information does not satisfy the first criterion, wherein regulating the upload of files further comprises pausing the upload when the mobile device operating information does not satisfy the first criterion; and instruct, via the content management system, the mobile device to resume the upload of files from the client application on the mobile device to the content management server when further updated operating information satisfies a second criterion, wherein the second criterion is whether the battery level exceeds a second threshold level.

16. The computer system of claim 15, wherein the files are chosen from a group consisting of:
   photos;
   documents; and
   videos.

17. The computer system of claim 15, wherein the mobile device is a handheld device.

* * * * *